(12) United States Patent
Oguma et al.

(10) Patent No.: US 9,366,262 B2
(45) Date of Patent: Jun. 14, 2016

(54) FAN MOTOR

(71) Applicant: Nidec Corporation, Kyoto (JP)

(72) Inventors: Yoshiaki Oguma, Kyoto (JP); Masamune Hiraki, Kyoto (JP); Ryota Hayashida, Kyoto (JP); Makoto Kobayashi, Kyoto (JP); Shinsuke Hamano, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 719 days.

(21) Appl. No.: 13/676,290

(22) Filed: Nov. 14, 2012

(65) Prior Publication Data

US 2013/0171015 A1    Jul. 4, 2013

(30) Foreign Application Priority Data

Dec. 28, 2011 (JP) .................................. 2011-288762

(51) Int. Cl.
*F04D 25/06* (2006.01)
*H02K 9/04* (2006.01)
*H02K 9/06* (2006.01)

(52) U.S. Cl.
CPC .............. *F04D 25/06* (2013.01); *F04D 25/068* (2013.01); *F04D 25/0646* (2013.01); *H02K 9/04* (2013.01); *H02K 9/06* (2013.01)

(58) Field of Classification Search
CPC ... F04D 25/06; F04D 25/068; F04D 25/0646; H02K 5/16; H02K 5/04; H02K 9/06; H02K 9/04
USPC .................................. 417/366; 310/67 R, 90
See application file for complete search history.

(56) References Cited

U.S. PATENT DOCUMENTS

| 6,278,207 | B1 * | 8/2001 | Matsumoto | ..................... 310/88 |
| 6,577,031 | B2 * | 6/2003 | Morooka et al. | ............ 310/68 R |
| 2005/0259394 | A1 * | 11/2005 | Lin | ................ 361/695 |
| 2007/0145842 | A1 * | 6/2007 | Zhu et al. | ........................ 310/88 |
| 2012/0039729 | A1 * | 2/2012 | Horng et al. | ............... 417/410.1 |

FOREIGN PATENT DOCUMENTS

| JP | 04-97496 U | 8/1992 |
| WO | 03/015243 A1 | 2/2003 |

* cited by examiner

*Primary Examiner* — Devon Kramer
*Assistant Examiner* — Lilya Pekarskaya
(74) *Attorney, Agent, or Firm* — Keating & Bennett, LLP (57) ABSTRACT

A fan motor includes a motor; an impeller; a motor control board; an AC/DC converter board; electronic components mounted on the AC/DC converter board; and a housing arranged to contain the motor, the impeller, the motor control board, and the AC/DC converter board. The housing includes a base portion arranged to hold a stationary portion of the motor on an axially upper side thereof; and a case portion arranged to extend to assume a tubular shape on an axially lower side of the base portion. The AC/DC converter board is arranged in an interior space of the case portion. At least a portion of the interior space is filled with a resin material. Surfaces of the AC/DC converter board and the electronic components are covered with the resin material. The fan motor further includes a projecting portion arranged to project into the interior space.

19 Claims, 6 Drawing Sheets

FAN MOTOR

BACKGROUND OF THE INVENTION

1. Field of the Invention

The present invention relates to a fan motor.

2. Description of the Related Art

Axial fan motors arranged to produce axial air currents by rotating impellers using driving forces of motors are known. The axial fan motors are installed, for example, in household electrical appliances, office automation appliances, transportation equipment, and so on, and are used for the purposes of dispersing heat from electronic components, circulating internal gases, and so on. The structures of such known fan motors are described, for example, in JP-UM-A 04-097496 and WO 2003/015243.

Recent years have seen an increasing demand to use DC motors instead of AC motors in order to improve the efficiency of fan motors. However, an AC/DC converter is required to drive the DC motor in an environment where only an AC power supply is available. Moreover, when an AC/DC converter board is arranged in a wind channel in the fan motor, an air current is interrupted by the AC/DC converter board. This leads to a decrease in the air volume of the fan motor.

JP-UM-A 04-097496 discloses a conventional structure in which an AC/DC converter block is attached to an outside of a housing of a fan motor (see, FIG. 4 of JP-UM-A 04-097496). However, the structure of JP-UM-A 04-097496 causes the AC/DC converter block to partially increase the radial dimension of the fan motor. This structure imposes great constraints on attachment of the fan motor to a target device.

Meanwhile, WO 2003/015243 discloses a conventional structure in which a drive control portion including an AC/DC converter and a control circuit is contained in a base portion of a bearing boss (see FIG. 1 of WO 2003/015243). However, in the case where the AC/DC converter includes a large electronic component, the structure of WO 2003/015243 requires the bearing boss to have a large size. An increased size of the bearing boss restricts the size of a stator and that of blades, and this leads to a decrease in performance of the fan motor.

In recent years, there has been an increased demand for improved efficiency particularly in the field of household electrical appliances. Household electrical appliances such as washing machines and refrigerators are used in high humidity environments or in environments where they are easily exposed to water droplets. Therefore, in the case where the AC/DC converter board is arranged in the fan motor, it is desirable that waterproofness of the board should be taken into consideration.

As a conceivable waterproof structure, the AC/DC converter board may be covered with a resin material, for example. However, in the case where a large electronic component is mounted on a portion of the AC/DC converter board, it is difficult to cover this electronic component and an adjacent area, and a remaining portion of the AC/DC converter board, with a small amount of the resin material.

SUMMARY OF THE INVENTION

According to a preferred embodiment of the present invention, a fan which includes a motor arranged to rotate a rotating portion thereof about a central axis extending in a vertical direction; an impeller arranged to rotate together with the rotating portion to produce an axial air current; a motor control board arranged to supply drive currents to coils of the motor; an AC/DC converter board arranged to convert an alternating current supplied from an external power supply into a direct current, and then supply the resulting direct current to the motor control board; electronic components mounted on the AC/DC converter board; and a housing arranged to contain the motor, the impeller, the motor control board, and the AC/DC converter board. The housing includes a base portion arranged to hold a stationary portion of the motor on an axially upper side thereof; and a case portion arranged to extend to assume a tubular shape on an axially lower side of the base portion. The AC/DC converter board is arranged in an interior space of the case portion. At least a portion of the interior space is filled with a resin material. Surfaces of the AC/DC converter board and the electronic components are covered with the resin material. The fan motor preferably further includes a projecting portion arranged to project into the interior space. According to the above preferred embodiment of the present invention, the AC/DC converter board is preferably arranged at such a position that the AC/DC converter board does not interrupt, or only hardly interrupts, the air current. Moreover, the AC/DC converter board and the electronic components are preferably protected from water droplets by the resin material. Furthermore, a portion of the interior space of the case portion is preferably occupied by the projecting portion, so that a reduction in the amount of the resin material used is achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a central axis of a fan motor is referred to by the term "axial direction", "axial", or "axially", that directions perpendicular or substantially perpendicular to the central axis of the fan motor are referred to by the term "radial direction", "radial", or "radially", and that a direction along a circular arc centered on the central axis of the fan motor is referred to by the term "circumferential direction", "circumferential", or "circumferentially". It is also assumed herein that a vertical direction is the axial direction, and that a side on which a base portion is arranged with respect to a case portion is defined as an upper side. The shape of each member or portion and relative positions of different members or portions will be described based on the above assumptions. It should be noted, however, that the above definitions of the vertical direction and the upper and lower sides are simply made for the sake of convenience in description, and should not be construed to restrict in any way the orientation of a fan motor according to any preferred embodiment of the present invention when in use.

Figure 1:
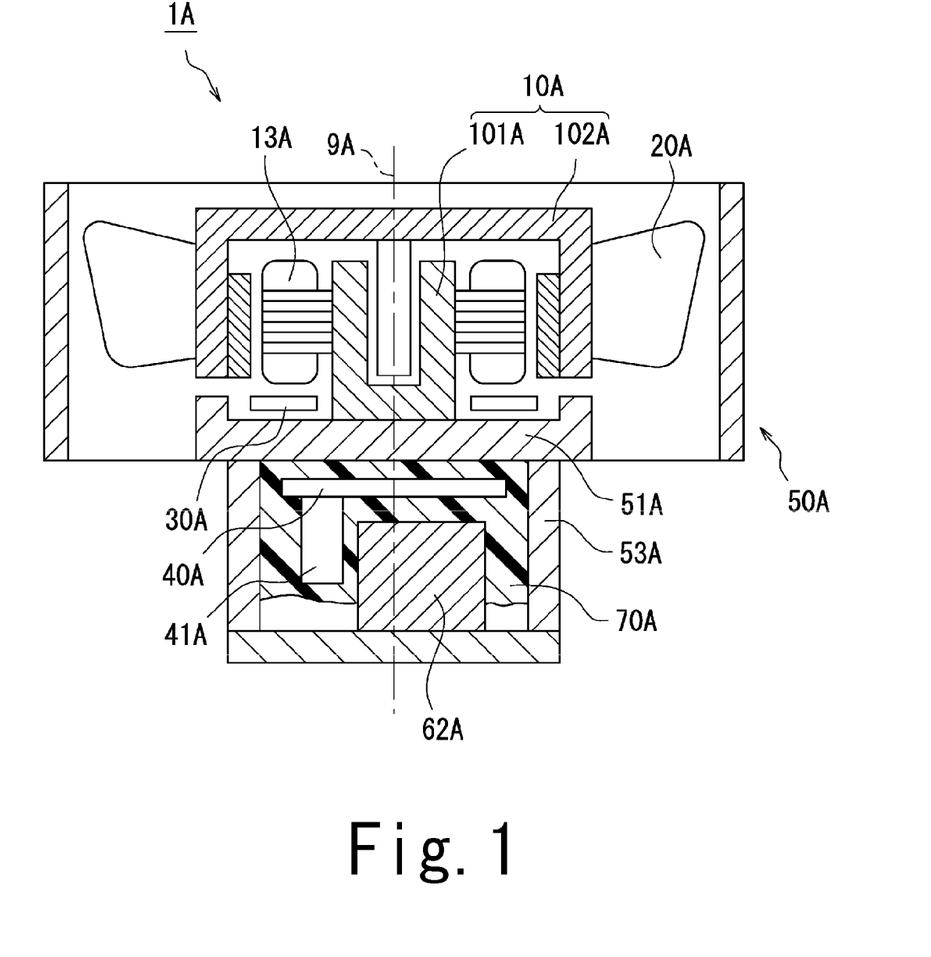
FIG. 1 is a vertical cross-sectional view of a fan motor according to a preferred embodiment of the present invention.

FIG. 1 is a vertical cross-sectional view of a fan motor 1A according to a preferred embodiment of the present invention. As illustrated in FIG. 1, the fan motor 1A preferably includes a motor 10A, an impeller 20A, a motor control board 30A, an AC/DC converter board 40A, and a housing 50A.

The motor 10A includes a stationary portion 101A and a rotating portion 102A. The motor 10A is arranged to rotate the rotating portion 102A about a rotation central axis 9A. The impeller 20A is arranged to rotate together with the rotating portion 102A during driving of the motor 10A, so that axial air currents are produced. The motor control board 30A is arranged to supply drive currents to coils 13A of the motor 10A. The AC/DC converter board 40A is preferably arranged to convert an alternating current supplied from an external power supply into a direct current, and to supply the resulting direct current to the motor control board 30A. An electronic component 41A is mounted on the AC/DC converter board 40A.

The housing 50A is preferably arranged to contain the motor 10A, the impeller 20A, the motor control board 30A, and the AC/DC converter board 40A. The housing 50A preferably includes a base portion 51A and a case portion 53A. The base portion 51A is preferably arranged to hold the stationary portion 101A of the motor 10A on an axially upper side thereof. The case portion 53A preferably has a tubular shape on an axially lower side of the base portion 51A.

The AC/DC converter board 40A is arranged in an interior space of the case portion 53A. Therefore, air currents produced by the impeller 20A are preferably not, or are only barely, interrupted by the AC/DC converter board 40A. Moreover, at least a portion of the interior space of the case portion 53A is filled with a resin material 70A. Surfaces of the AC/DC converter board 40A and the electronic component 41A are thereby covered with the resin material 70A. Each of the AC/DC converter board 40A and the electronic component 41A is thereby preferably protected from water.

In addition, the fan motor 1A preferably further includes a projecting portion 62A arranged to project into the interior space of the case portion 53A. The projecting portion 62A occupies a portion of the interior space of the case portion 53A. The amount of the resin material 70A used is thereby reduced.

Next, a more specific preferred embodiment of the present invention will now be described below.

Figure 2:
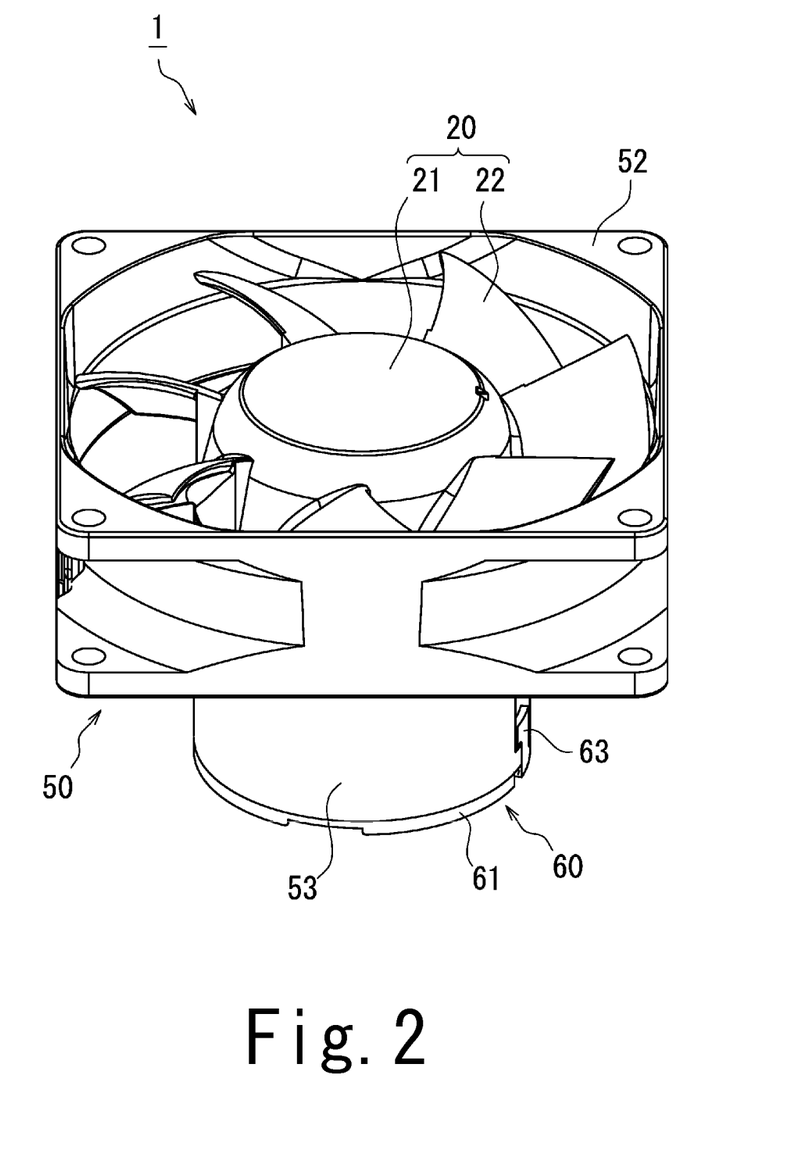
FIG. 2 is a perspective view of a fan motor according to a preferred embodiment of the present invention.
Figure 3:
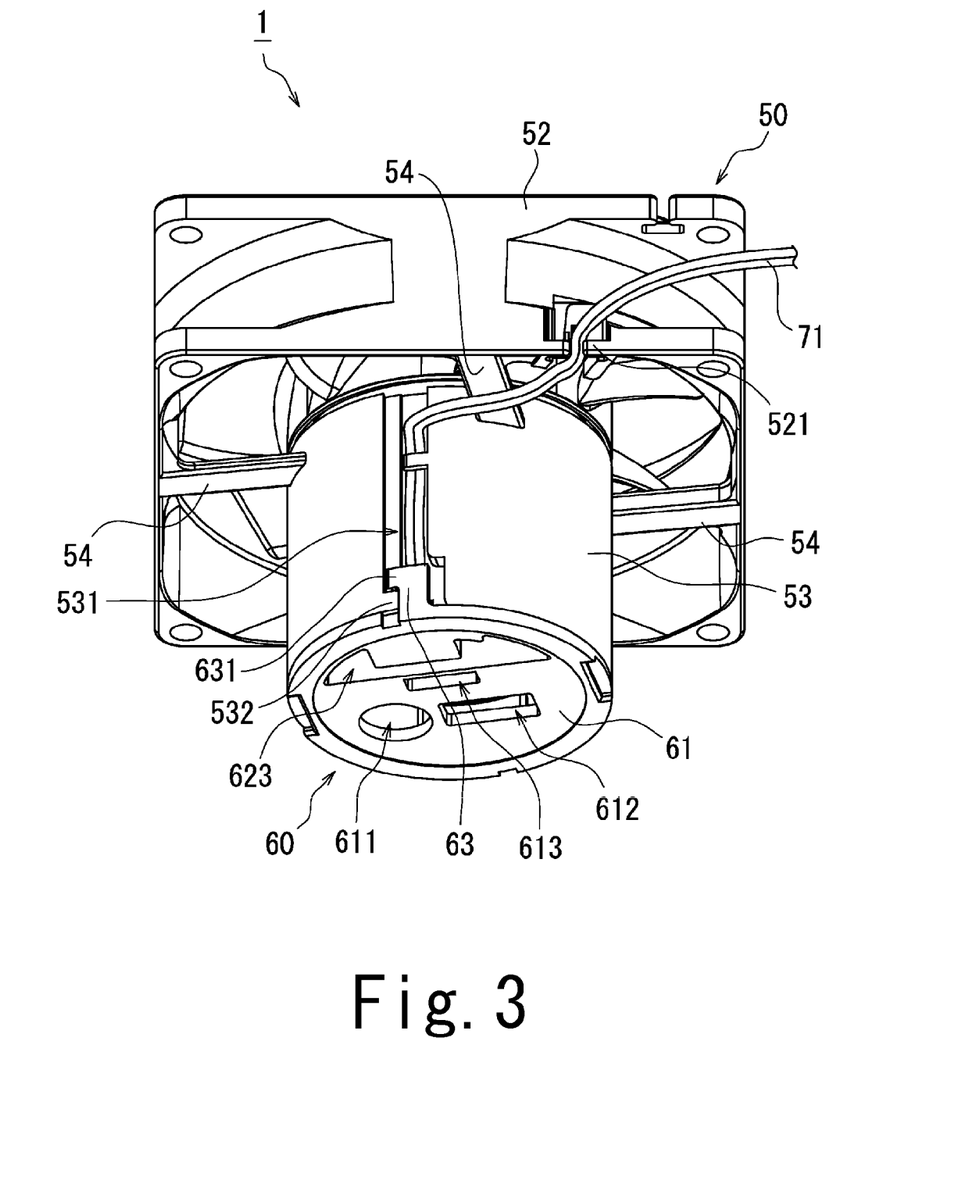
FIG. 3 is a perspective view of the fan motor according to a preferred embodiment of the present invention.
Figure 4:
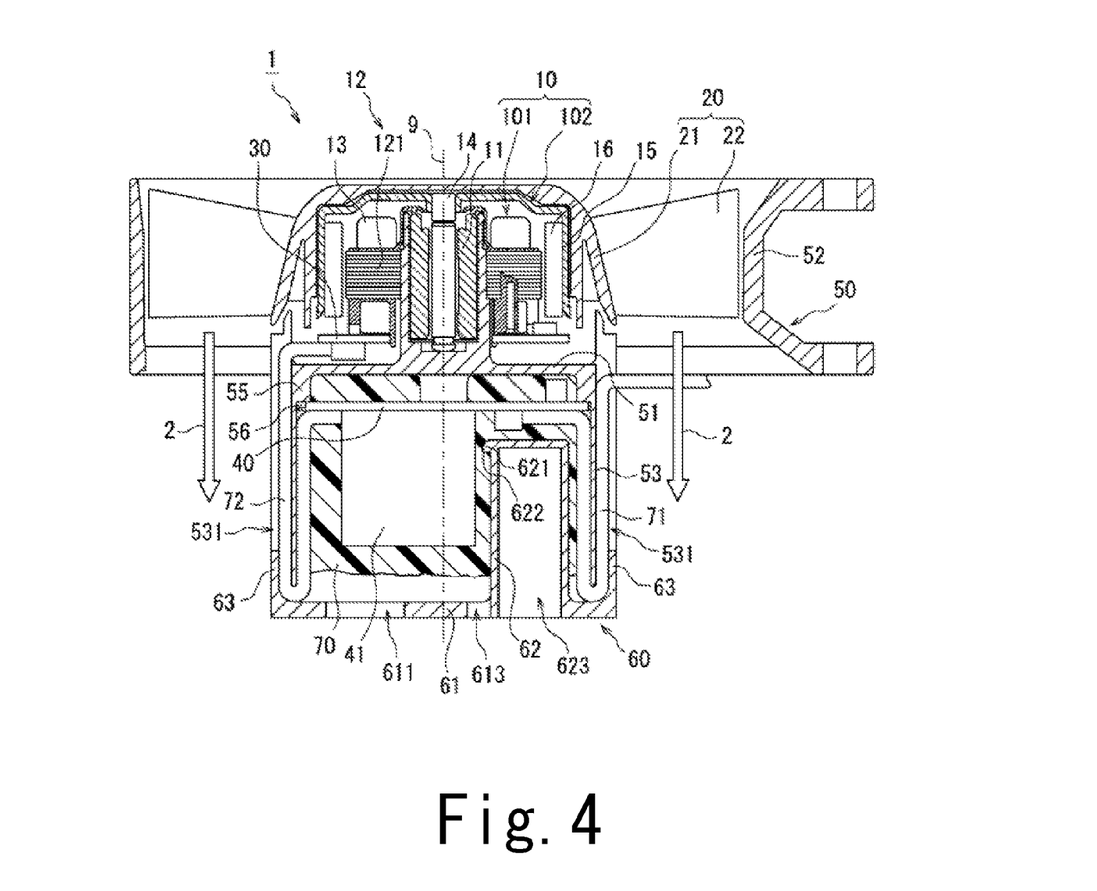
FIG. 4 is a vertical cross-sectional view of the fan motor according to a preferred embodiment of the present invention.

FIGS. 2 and 3 are each a perspective view of a fan motor 1 according to a specific preferred embodiment of the present invention. FIG. 4 is a vertical cross-sectional view of the fan motor 1 according to the specific preferred embodiment. The fan motor 1 is preferably an axial fan motor arranged to produce axial air currents by using driving forces of a motor 10. The fan motor 1 is preferably installed, for example, in a household electrical appliance, such as a washing machine, a refrigerator, etc., and is preferably arranged to disperse heat from electronic components, and to circulate an internal gas, or the like. Hereinafter, a device in which the fan motor 1 is installed will be referred to as a "target device".

As illustrated in FIGS. 2 to 4, the fan motor 1 according to the present preferred embodiment includes the motor 10, an impeller 20, a motor control board 30, an AC/DC converter board 40, a housing 50, and a cover member 60.

The motor 10 includes a stationary portion 101 and a rotating portion 102. The stationary portion 101 is arranged to be stationary relative to the housing 50. The rotating portion 102 is supported to be rotatable with respect to the stationary portion 101. The stationary portion 101 preferably includes a sleeve 11, a stator core 12, and coils 13. The rotating portion 102 preferably includes a shaft 14, a rotor holder 15, and a plurality of magnets 16.

Each of the sleeve 11 and the stator core 12 is held on an axially upper side of a base portion 51 of the housing 50. The sleeve 11 is preferably a substantially cylindrical member arranged to extend in the axial direction. The shaft 14 is inserted in the sleeve 11. The stator core 12 includes a plurality of teeth 121 arranged to extend radially with respect to a central axis 9. Each of the coils 13 is preferably defined by, for example, a conducting wire wound around a separate one of the teeth 121. However, it should be noted that any other desirable type of coil could be used.

The shaft 14 is a columnar member arranged to extend in the axial direction. The shaft 14 is rotatably supported by the sleeve 11. An upper end portion of the shaft 14 is preferably arranged to project upward above an upper surface of the sleeve 11. The rotor holder 15 is fixed to the upper end portion of the shaft 14, and is arranged to extend radially outward therefrom. The magnets 16 are fixed to the rotor holder 15 on a radially outer side of the stator core 12. In addition, the magnets 16 are arranged in a circumferential direction such that north poles and south poles alternate with each other.

Once drive currents are supplied to the coils 13 through the motor control board 30, magnetic flux is generated around each of the teeth 121 of the stator core 12. Then, a circumferential torque is produced by interaction between the magnetic flux of the teeth 121 and that of the magnets 16, so that the shaft 14, the rotor holder 15, and the magnets 16 are caused to rotate about the central axis 9.

The impeller 20 preferably includes a cup portion 21 and a plurality of blades 22. The cup portion 21 is fixed to the rotor holder 15. The blades 22 are arranged to extend radially outward from an outer circumferential surface of the cup portion 21. Once the motor 10 is driven, the impeller 20 starts rotating together with the rotating portion 102 of the motor 10. Moreover, each blade 22 is arranged to extend obliquely with respect to the circumferential direction. Accordingly, once the impeller 20 is rotated, an axially downward air current 2 is produced inside an outer frame portion 52 of the housing 50 as indicated by arrow outlines with blank insides in FIG. 4. The outer frame portion 52 will be described below.

The motor control board 30 is preferably arranged between the base portion 51 of the housing 50 and the coils 13 of the motor 10. The base portion 51 will be described below. End portions of the conducting wires defining the coils 13 are preferably soldered to lands on the motor control board 30. An electronic circuit arranged to control the drive currents is mounted on the motor control board 30. The drive currents are supplied from the motor control board 30 to the coils 13 during driving of the fan motor 1.

The AC/DC converter board 40 is arranged on a lower side of the base portion 51. An external AC power supply and the AC/DC converter board 40 are preferably electrically connected with each other through a first lead wire 71. In addition, the AC/DC converter board 40 and the motor control board 30 are preferably electrically connected with each other through a second lead wire 72. An alternating current supplied from the AC power supply through the first lead wire 71 is converted by the AC/DC converter board 40 into a direct current. The resulting direct current is outputted from the AC/DC converter board 40 and supplied to the motor control board 30 through the second lead wire 72.

An electronic circuit arranged to convert the alternating current into the direct current is mounted on the AC/DC converter board 40. This electronic circuit preferably includes a plurality of electronic components. A capacitor 41, which defines a portion of the electronic circuit, is preferably mounted on a lower surface of the AC/DC converter board 40. The capacitor 41 preferably has the greatest axial dimension of all the electronic components mounted on the AC/DC converter board 40.

In this fan motor 1, the motor control board 30 and the AC/DC converter board 40 preferably are provided separately. It is therefore possible to use a general-purpose DC circuit board as the motor control board 30. This makes it possible to manufacture the fan motor 1 at a lower cost than in the case where a single board having functions of both the motor control board 30 and the AC/DC converter board 40 is produced.

The housing 50 preferably includes the base portion 51, the outer frame portion 52, a case portion 53, and a plurality of ribs 54. The base portion 51 is preferably arranged to extend in directions perpendicular or substantially perpendicular to the central axis 9 between the motor control board 30 and the AC/DC converter board 40. The outer frame portion 52 is preferably an annular portion arranged on a radially outer side of the impeller 20. A wind channel extending in the axial direction through the outer frame portion 52 is preferably defined on a radially inner side of the outer frame portion 52. The motor 10, the impeller 20, and the motor control board 30 are accommodated above the base portion 51 and on the radially inner side of the outer frame portion 52.

The case portion 53 is a substantially cylindrical portion arranged to extend downward from a lower surface of the base portion 51. The case portion 53 is arranged to be substantially concentric with the central axis 9. In the present preferred embodiment, the case portion 53 is arranged on the lower side of the base portion 51, where the case portion 53 does not, or only barely, interrupts the air current 2. The AC/DC converter board 40 is preferably arranged in an interior space of the case portion 53. The AC/DC converter board 40 can thus be provided in the fan motor 1 while a decrease in the air volume of the fan motor 1 is reduced.

Moreover, in the present preferred embodiment, a portion of an outer circumferential surface of the case portion 53 which is the farthest from the central axis 9 and a portion of an outer circumferential surface of the base portion 51 which is the farthest from the central axis 9 are arranged at substantially the same radial position. The case portion 53 is thus prevented from interrupting the air current 2. This leads to a further reduction in the decrease in the air volume of the fan motor 1. Note that the portion of the outer circumferential surface of the case portion 53 which is the farthest from the central axis 9 may be arranged radially inward of the portion of the outer circumferential surface of the base portion 51 which is the farthest from the central axis 9.

Furthermore, according to the present preferred embodiment, the inclusion of the AC/DC converter board 40 does not result in an increase in the radial dimension of the fan motor 1. Therefore, the AC/DC converter board 40 rarely provides an obstacle when the fan motor 1 is attached to the target device. Furthermore, according to the present preferred embodiment, the AC/DC converter board 40 preferably does not restrict the size of the motor 10 or that of the impeller 20. This makes it easier to design the fan motor 1 such that the fan motor 1 has high power.

The ribs 54 are preferably arranged to join an outer circumferential portion of the base portion 51 or an upper portion of the case portion 53 to the outer frame portion 52 in a beam-shaped configuration. The ribs 54 are preferably arranged at substantially regular intervals in the circumferential direction. The air current 2, which is produced by the impeller 20, flows between the ribs 54 and downward around the case portion 53.

In the present preferred embodiment, the housing 50 including the base portion 51, the outer frame portion 52, the case portion 53, and the ribs 54 is preferably defined by a single monolithic resin-molded article. This makes it possible to obtain the housing 50 at a lower cost than in a case where a plurality of members are combined to define the housing 50. Moreover, because the housing 50 is a single monolithic resin-molded article including the base portion 51 and the case portion 53, the base portion 51 and the case portion 53 are joined to each other continuously. This makes it difficult for a water droplet to intrude into the interior space of the case portion 53 through a gap between the base portion 51 and the case portion 53.

In addition, a resin material 70 is held in the interior space of the case portion 53. A thermosetting silicone resin, for example, is preferably used as the resin material 70. The resin material 70 may be arranged either to fill the entire interior space of the case portion 53 or to fill only a portion of the interior space of the case portion 53. In the present preferred embodiment, a lower surface of the resin material 70 is preferably arranged below a lower surface of the capacitor 41. Moreover, surfaces of the AC/DC converter board 40 and the plurality of electronic components mounted on the AC/DC converter board 40 are preferably covered with the resin material 70. A surface of the capacitor 41 is also covered with the resin material 70. Even if the fan motor 1 is exposed to water droplets, the AC/DC converter board 40 and the electronic components mounted on the AC/DC converter board 40 are protected from the water droplets because of the resin material 70.

The cover member 60 is attached to a lower portion of the case portion 53. The cover member 60 is preferably a resin-molded article including a bottom plate portion 61 and a projecting portion 62. The bottom plate portion 61 is a substantially disk-shaped portion arranged to close a lower opening of the case portion 53. The projecting portion 62 is arranged to project upward from the bottom plate portion 61. The projecting portion 62 is arranged to extend in the axial direction from the bottom plate portion 61 in a region not overlapping with the capacitor 41 in the interior space of the case portion 53. A portion of the interior space of the case portion 53 is occupied by the projecting portion 62. The interior space of the case portion 53 is thereby narrowed. Narrowing of the interior space of the case portion 53 means that a reduced amount of the resin material 70 may be filled thereinto. This in turn leads to a reduced production cost of the fan motor 1.

In addition, the projecting portion 62 preferably includes a hook 621. As illustrated in FIG. 4, in the present preferred embodiment, the hook 621 is arranged to project sideways from an upper end portion of the projecting portion 62. A lower surface of the hook 621 preferably defines an engagement surface 622 arranged to axially overlap with the resin material 70. This engagement surface 622 is axially engaged with the resin material 70. This contributes to preventing the cover member 60 from coming off in a downward direction.

When the fan motor 1 is manufactured, the resin material 70 in a molten state is in flux in the vicinity of the hook 621.

Then, as a result of the molten resin material 70 being cured, the engagement surface 622 of the hook 621 and the resin material 70 are preferably engaged with each other. Engagement between the engagement surface 622 and the resin material 70 is easily accomplished in this manner. Therefore, the required level of dimensional precision of the hook 621 is lower than in the case of a common snap fit.

Note that the projecting portion 62 and the resin material 70 may be engaged with each other by a structure other than the hook 621. For example, a cut or a hole may be defined in the projecting portion 62 in place of the hook 621. The engagement between the projecting portion 62 and the resin material 70 only requires that the projecting portion 62 should preferably include an engagement surface arranged to axially overlap with the resin material 70.

The bottom plate portion 61 preferably includes a first through hole 611, a second through hole 612, and a third through hole 613 defined therein. Each of the first, second, and third through holes 611, 612, and 613 is arranged to extend in the axial direction through the bottom plate portion 61. In the present preferred embodiment, the first, second, and third through holes 611, 612, and 613 are preferably arranged separately from one another. Note that the first, second, and third through holes 611, 612, and 613 may alternatively be arranged to be continuous with one another.

Each of the first and second through holes 611 and 612 is arranged at a position away from the projecting portion 62. When the fan motor 1 is manufactured, the resin material 70 is injected into the interior space of the case portion 53 through the first through hole 611 after the cover member 60 is attached to the case portion 53. When the resin material 70 is injected into the interior space of the case portion 53, it is possible to view a situation of the resin material 70 in the interior space of the case portion 53 through the second through hole 612.

The third through hole 613 is preferably arranged at a position axially overlapping with the engagement surface 622 of the hook 621. When the cover member 60 is molded, a mold arranged to mold the engagement surface 622 of the hook 621 is arranged to pass through the third through hole 613. Note that the third through hole 613 may alternatively be used to view the situation of the injected resin material 70 without the second through hole 612 being defined in the bottom plate portion 61.

In addition, the cover member 60 according to the present preferred embodiment preferably includes a recessed portion 623 arranged to be recessed axially into the projecting portion 62 from a lower surface of the bottom plate portion 61. If the projecting portion 62 were filled, without the recessed portion 623 being defined therein, a sink mark, i.e., a local recess, might occur in a surface of the projecting portion 62 during a process of the molten resin being cooled and cured in the injection molding process. However, in the present preferred embodiment, the thickness of the resin of the projecting portion 62 is reduced by the above-described recessed portion 623. This contributes to preventing a sink mark from occurring in the vicinity of the projecting portion 62. Moreover, the recessed portion 623 preferably contributes to reducing the amount of the resin material 70 used to define the cover member 60 as compared to the case where the projecting portion 62 is filled, without a cavity defined therein.

In addition, in the present preferred embodiment, the outer circumferential surface of the case portion 53 preferably includes axially extending grooves 531 defined therein. The first and second lead wires 71 and 72 extending from the AC/DC converter board 40 are each drawn out through a gap between the case portion 53 and the cover member 60. These lead wires 71 and 72 are then arranged to extend along the grooves 531. This contributes to preventing each of the lead wires 71 and 72 from projecting from the outer circumferential surface of the case portion 53. Prevention of projection of the lead wires 71 and 72 leads to an additional reduction in the decrease in the air volume of the fan motor 1, and also makes it easier to attach the fan motor 1 to the target device.

In addition, an outer circumferential portion of the cover member 60 according to the present preferred embodiment preferably includes plate-shaped hold-down portions 63. Each hold-down portion 63 is arranged to project upward along a separate one of the grooves 531 from an edge portion of the bottom plate portion 61. Each of the first and second lead wires 71 and 72 is arranged to be in contact with a radially inner surface of the hold-down portion 63. Each of the first and second lead wires 71 and 72 is thereby further restrained from bulging radially outward.

In addition, as illustrated in FIG. 3, each hold-down portion 63 according to the present preferred embodiment preferably includes a claw portion 631 arranged to project to one side in the circumferential direction. Meanwhile, the case portion 53 preferably includes lock receiving portions 532 each arranged to project to the other side in the circumferential direction, that is, from an edge of the groove 531 into the groove 531. Then, each claw portion 631 is engaged with a corresponding one of the lock receiving portions 532. The cover member 60 is preferably temporarily fixed to the case portion 53 by this engagement between the lock receiving portions 532 and the claw portions 631 before the resin material 70 is injected into the interior space of the case portion 53. That is, the hold-down portions 63 according to the present preferred embodiment play both a role of holding down the first and second lead wires 71 and 72 and a role of temporarily fixing the cover member 60 to the case portion 53.

In addition, as illustrated in FIG. 4, the housing 50 according to the present preferred embodiment preferably includes a mount portion 55 arranged to project downward from the lower surface of the base portion 51. The mount portion 55 is substantially annular in shape, and is arranged to extend along an inner circumferential surface of the case portion 53. An upper surface of the AC/DC converter board 40 is arranged to be in contact with a lower surface of the mount portion 55. The lower surface of the base portion 51 is thereby prevented from coming into contact with the upper surface of the AC/DC converter board 40.

In particular, in the present preferred embodiment, the axial projection height of the mount portion 55 with reference to the lower surface of the base portion 51 is arranged to be greater than the axial height of the highest one of the electronic components mounted on the upper surface of the AC/DC converter board 40 with reference to the upper surface of the AC/DC converter board 40. The lower surface of the base portion 51 is thereby preferably prevented from coming into contact with any electronic component mounted on the upper surface of the AC/DC converter board 40.

In addition, the housing 50 according to the present preferred embodiment preferably further includes a projection 56 arranged to project from the mount portion 55 into the interior space of the case portion 53. At least a portion of the projection 56 is preferably arranged inside a cut or a hole defined in the AC/DC converter board 40. When the AC/DC converter board 40 is arranged in the interior space of the case portion 53, the mount portion 55 can be used to position the AC/DC converter board 40 in the axial direction. In addition, the projection 56 can be used to position the AC/DC converter board 40 in both the circumferential and radial directions.

Moreover, a circumferential turn of the AC/DC converter board 40 is prevented by the projection 56.

At the time of the injection of the resin material 70, the AC/DC converter board 40 may tend to be easily displaced downward because of a portion of the resin material 70 which has moved into a space on an upper side of the AC/DC converter board 40. In the present preferred embodiment, however, the lower surface of the AC/DC converter board 40 and an upper surface of the projecting portion 62 preferably are arranged axially opposite each other. Accordingly, the projecting portion 62 serves to restrict the downward displacement of the AC/DC converter board 40. If the AC/DC converter board 40 is restrained from being displaced downward, a lower end portion of the capacitor 41 is also restrained from being displaced downward. Therefore, a reduction in the amount of the resin material 70 injected and needed to cover both the AC/DC converter board 40 and the capacitor 41 is achieved.

In addition, as illustrated in FIG. 3, in the present preferred embodiment, the outer frame portion 52 of the housing 50 preferably includes a lead wire holding portion 521 arranged to hold the first lead wire 71. In addition, one of the ribs 54 and a straight line joining the lead wire holding portion 521 and an upper end portion of the groove 531 are arranged to cross each other in a plan view. That is, the straight line and the rib 54 overlap with each other in the plan view. The first lead wire 71 is arranged to extend from the groove 531 toward the lead wire holding portion 521 through a lower side of the rib 54. This arrangement enables the rib 54 to restrict upward displacement of the first lead wire 71 even if the first lead wire 71 bends. This contributes to preventing the first lead wire 71 from coming into contact with the impeller 20, which is arranged on an upper side of the rib 54. This in turn contributes to preventing a break in the first lead wire 71 and occurrence of a noise.

While preferred embodiments of the present invention have been described above, it is to be understood that the present invention is not limited to the above-described preferred embodiments.

Figure 5:
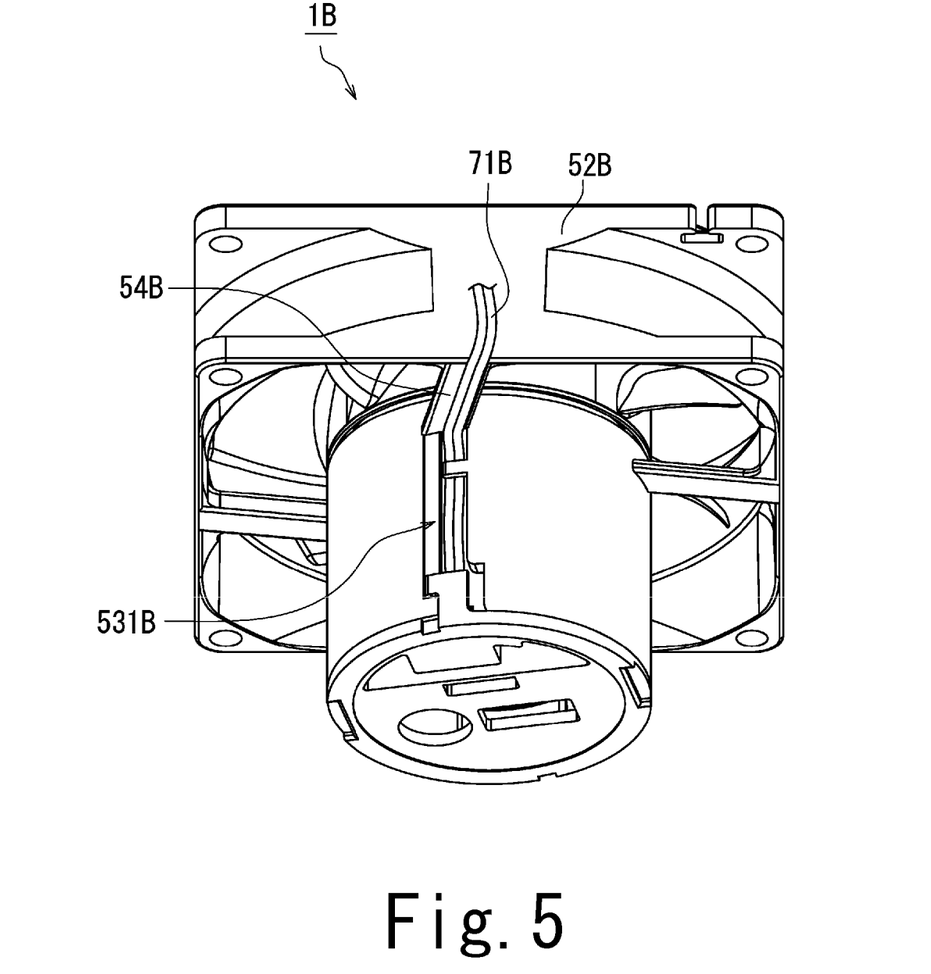
FIG. 5 is a perspective view of a fan motor according to a modification of a preferred embodiment of the present invention.

FIG. 5 is a perspective view of a fan motor 1B according to a modification of a preferred embodiment of the present invention described above. In the modification illustrated in FIG. 5, one or more ribs 54B are arranged to extend from a vicinity of an upper end portion of a groove 531B. The rib(s) 54B is arranged to extend substantially in a radial direction to join the vicinity of the upper end portion of the groove 531B and an outer frame portion 52B. A first lead wire 71B is arranged to extend along the groove 531B and the rib(s) 54B. The above arrangement preferably contributes to more effectively preventing the first lead wire 71B from interrupting an air current. Note that the second lead wire may also be arranged to extend along one or more ribs 54B in a similar manner.

Figure 6:
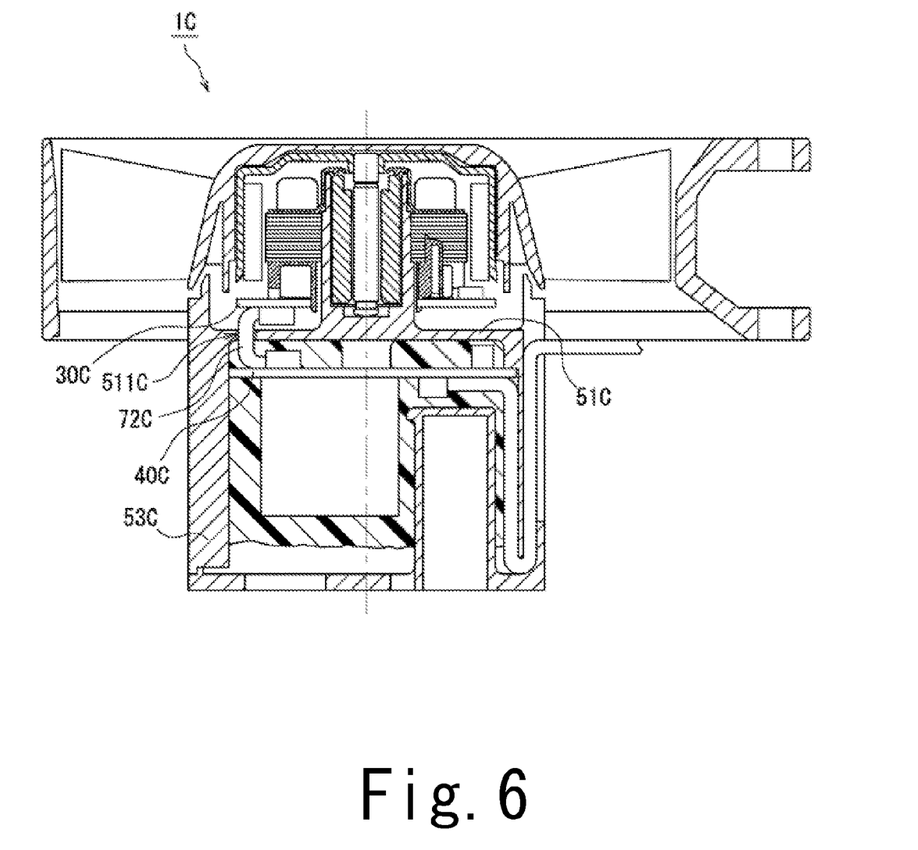
FIG. 6 is a vertical cross-sectional view of a fan motor according to a modification of a preferred embodiment of the present invention.

FIG. 6 is a vertical cross-sectional view of a fan motor 1C according to another modification of a preferred embodiment of the present invention described above. In the modification illustrated in FIG. 6, a base portion 51C includes a base hole 511C arranged to extend in the axial direction therethrough. A second lead wire 72C is arranged to extend through the base hole 511C. This arrangement makes it possible to electrically connect a motor control board 30C and an AC/DC converter board 40C with each other without drawing the second lead wire 72C out of a case portion 53C. This makes it possible to reduce the length of the second lead wire 72C, and also preferably contributes to preventing the second lead wire 72C from interrupting an air current.

Note that the projecting portion may be provided in the cover member as in a preferred embodiment of the present invention described above, but may alternatively be provided in the case portion. That is, the projecting portion may be arranged to project radially inward from an inner circumferential surface of the case portion. Also in this case, a reduction in the amount of the resin material used is achieved by the projecting portion occupying a portion of the interior space of the case portion. Moreover, in the case where the projecting portion is provided in the case portion, the cover member may be omitted. Note, however, that it is more preferable that the projecting portion should be provided in the cover member, because the projecting portion thus does not constitute an obstacle when the AC/DC converter board is arranged in the interior space of the case portion.

Also note that the outside shape of the case portion may be substantially cylindrical as in the above-described predetermined embodiment, but may alternatively be another shape. For example, the outside shape of the case portion may be the shape of a square or rectangular tube. Note, however, that in the case where the outside shape of the case portion is cylindrical, a larger interior space of the case portion can be secured while the case portion is preferably restrained from disturbing an air current.

Also note that each of the impeller 20, the housing 50, and the cover member 60 may be made of either a resin or another material. For example, one, two, or all of the impeller 20, the housing 50, and the cover member 60 may be made of a metal, if so desired.

Also note that fan motors according to preferred embodiments of the present invention may be installed in devices other than household electrical appliances. For example, a fan motor according to a preferred embodiment of the present invention may be installed in an electronic device such as, for example, a personal computer or the like for the purpose of internal cooling. Also, fan motors according to preferred embodiments of the present invention may be installed in various other types of office automation appliances, medical appliances, or transportation equipment. However, household electrical appliances such as refrigerators and washing machines demand particularly high efficiency, and are used in an environment where they are easily exposed to water. Therefore, the present invention is particularly useful for such household electrical appliances.

Also note that fan motors according to preferred embodiments of the present invention may differ in details of structure from the fan motors according to the above-described preferred embodiments and the modifications thereof. Also note that features of the above-described preferred embodiments and the modifications thereof may be combined appropriately as long as no conflict arises.

Preferred embodiments of present invention are applicable to fan motors, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fan motor comprising:
   a motor that rotates a rotating portion thereof about a central axis extending in a vertical direction;
   an impeller that rotates together with the rotating portion to produce an axial air current;
   a motor control board that supplies drive currents to coils of the motor;

an AC/DC converter board that converts an alternating current supplied from an external power supply into a direct current, and supplies the direct current to the motor control board;
electronic components mounted on the AC/DC converter board;
a housing that contains the motor, the impeller, the motor control board, and the AC/DC converter board; and
a cover portion including a bottom plate portion; wherein the housing includes:
  a base portion that holds a stationary portion of the motor on an axially upper side thereof; and
  a case portion that extends to assume a tubular shape on an axially lower side of the base portion;
the AC/DC converter board is located in an interior space of the case portion;
at least a portion of the interior space of the case portion is filled with a resin material;
surfaces of the AC/DC converter board and the electronic components are covered with the resin material;
the bottom plate portion closes a lower opening defined in the case portion;
the fan motor further comprises a projecting portion that is defined together with the bottom plate portion as a single monolithic member, the projecting portion extending into the interior space of the case portion; and
a lower surface of the AC/DC converter board and an upper surface of the projecting portion are arranged axially opposite each other.

2. The fan motor according to claim 1, wherein the case portion has a cylindrical or substantially cylindrical outside shape.

3. The fan motor according to claim 1, wherein a portion of an outer circumferential surface of the case portion that is farthest from the central axis is arranged at substantially a same radial position as, or radially inward of, a portion of an outer circumferential surface of the base portion which is farthest from the central axis.

4. The fan motor according to claim 1, wherein the housing is a single monolithic resin-molded article including the base portion and the case portion.

5. The fan motor according to claim 1, wherein the bottom plate portion includes a first through hole that extends in an axial direction therethrough.

6. The fan motor according to claim 5, wherein the first through hole is arranged at a position spaced away from the projecting portion.

7. The fan motor according to claim 6, wherein the bottom plate portion further includes a second through hole that extends in the axial direction therethrough.

8. The fan motor according to claim 7, wherein the second through hole is arranged at a position spaced away from the projecting portion.

9. The fan motor according to claim 1, wherein
the projecting portion includes an engagement surface that extends to axially overlap with the resin material; and
the engagement surface is in contact with the resin material.

10. The fan motor according to claim 9, wherein
the bottom plate portion includes a third through hole that extends in an axial direction therethrough; and
the third through hole axially overlaps the engagement surface.

11. The fan motor according to claim 1, wherein the cover member is a resin-molded article, and includes a recessed portion that contacts the projecting portion from a lower surface of the bottom plate portion.

12. The fan motor according to claim 1, wherein
an outer circumferential surface of the case portion includes an axially extending groove defined therein; and
a lead wire extending from the AC/DC converter board is drawn out through a gap between the case portion and the cover member, and extends along the groove.

13. The fan motor according to claim 12, wherein
the cover member includes a plate-shaped hold-down portion that projects along the groove from an edge portion of the bottom plate portion; and
a radially inner surface of plate-shaped hold-down portion is in contact with the lead wire.

14. The fan motor according to claim 13, wherein
plate-shaped hold-down portion includes a claw portion that projects in a circumferential direction; and
the case portion further includes a lock receiving portion that engages with the claw portion.

15. The fan motor according to claim 13, wherein
the housing further includes:
  an annular outer frame portion arranged on a radially outer side of the impeller, and including a lead wire holding portion that holds the lead wire; and
  a plurality of ribs that join the outer frame portion to the base portion or the case portion; and
the lead wire extends from the groove toward the lead wire holding portion through a lower side of one of the ribs.

16. The fan motor according to claim 15, wherein
at least one of the ribs extends from an area of an upper end portion of the groove; and
the lead wire extends along the at least one of the ribs.

17. The fan motor according to claim 1, wherein the projecting portion extends radially inward from an inner circumferential surface of the case portion.

18. The fan motor according to claim 1, wherein the base portion includes a base hole that extends in an axial direction therethrough.

19. The fan motor according to claim 1, wherein
the housing further includes a mount portion that projects downward from the base portion;
a projection height of the mount portion with reference to a lower surface of the base portion is greater than a height of a highest one of the electronic components mounted on an upper surface of the AC/DC converter board with reference to the upper surface of the AC/DC converter board; and
a lower surface of the mount portion and the upper surface of the AC/DC converter board are in contact with each other.

* * * * *